US012302776B1

(12) United States Patent
Ray et al.

(10) Patent No.: US 12,302,776 B1
(45) Date of Patent: May 20, 2025

(54) ADAPTIVE TILLAGE CONTROL

(71) Applicant: Roy H. Ray and Sheila Barrett Ray Joint Revocable Trust, Las Cruces, NM (US)

(72) Inventors: Roy H. Ray, Las Cruces, NM (US); Sheila B. Ray, Las Cruces, NM (US)

(73) Assignee: Roy H. Ray and Sheila Barrett Ray Joint Revocable Trust, Las Cruces, NM (US)

( * ) Notice: Subject to any disclaimer, the term of this patent is extended or adjusted under 35 U.S.C. 154(b) by 0 days.

(21) Appl. No.: 19/020,671

(22) Filed: Jan. 14, 2025

(51) Int. Cl.
*A01B 79/00* (2006.01)
*A01B 63/111* (2006.01)

(52) U.S. Cl.
CPC .......... *A01B 79/005* (2013.01); *A01B 63/111* (2013.01)

(58) Field of Classification Search
CPC ..... A01B 79/005; A01B 79/00; A01B 63/111; A01B 63/10; A01B 63/02; A01B 63/00
See application file for complete search history.

(56) References Cited

FOREIGN PATENT DOCUMENTS

KR 20140013882 A * 2/2014 .............. A01C 7/12

* cited by examiner

*Primary Examiner* — Christopher J. Novosad
(74) *Attorney, Agent, or Firm* — Lempia Summerfield & Katz LLC

(57) ABSTRACT

An adaptive tillage control system includes a crossbar, a connecting bar, and cutting and casting rotary discs (discs) that are responsive to an adaptive tillage controller that facilitate angular positioning of the discs. Each disc has a convex outer vertical surface on an exterior side opposite a concave outer vertical surface at its inner side. The discs form a first pair of discs having convex outer vertical surfaces facing outward and a concave outer vertical surface facing inward. The discs also form a second pair of discs having a convex outer vertical surfaces facing outward and the concave outer vertical surface facing inward. The angular positions of the first pair of discs and the second pair of discs are based on a depth sensitivity coefficient that varies with geometric shapes of the discs and varies with the soil type that the discs manipulate.

20 Claims, 9 Drawing Sheets

ADAPTIVE TILLAGE CONTROL

1. TECHNICAL FIELD

An adjustable tillage control system that provides a consistent and efficient protective coverage across root zones.

2. RELATED ART

Preserving vine health in the growing and dormant seasons presents significant challenges, particularly when safeguarding the root network of grape producing vines. Extreme weather conditions can damage the root epidermis, while fluctuating temperatures and freeze-thaw cycles can cause root stress. Additionally, a loss of moisture caused by harsh winds and low humidity can compromise the plants' viability.

To mitigate these conditions, viticulturists may plant crops over root zones to reduce erosion and provide protection. However, labor costs, nutrient depletion (crop cover depleting nutrients), inconsistent growth, and a vineyard's scale can limit its effectiveness.

DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

Adaptive tillage control method(s) and system(s) (referred to as smart control system(s), adaptive control systems, adaptive tillage control systems, and/or system(s)) insulate root regions, prevent desiccation, and provide protection against adverse weather conditions. The systems mitigate erosion and damage while enhancing plant growth such as a grape producing vines. Some systems integrate feedback to adjust a controlled soil displacement, soil movement, and soil manipulation that improves drainage and protection that enhance plant growth. Using one or more cutting and casting rotary discs the adaptive tillage control system cuts through soil and other matter, scoops up and aerosolizes soil reaching calculated heights, and casts the suspended soil to one or more predetermined zone areas angled away from the adaptive tillage control system. In some applications, the systems cast soil at adapting angles and at adapting volumes. In some systems, the height of the displaced soil and the volume of the displaced soil is determined by a function of the system's acceleration, the system's velocity, the field's soil type (represented by one or more coefficients), and/or the depth and angle(s) of one or more cutting and casting rotary discs 106/108 (also referred to as the rotary disc(s)) to the ground and direction of travel.

The term soil type refers to multiple factors that characterize the soil's makeup that includes or reflects the soil's drainage performance, water-holding capacity, nutrient availability, root development (e.g., the texture and structure that influence how deeply and widely roots can grow), and ultimately, such in in vineyards, for example, produce or grapevine vigor and wine quality (e.g., reflect the influence on wine, for example limestone-rich soil is often associated with wines that have higher acidity). Soil types include sandy soils, clay soils, loam soils, chalky soils, volcanic soils, etc.

Sandy soils, characterized by high permeability, may limit water and nutrient availability, while clay soils with high water-holding capacity can cause waterlogging. Loamy soils often have a balanced texture and offer optimal conditions for root growth. Additionally, other soil types, such as calcareous (chalky) and volcanic soils, can impart unique mineral signatures on the grapes, influencing the wine's flavor and aroma profile. Various soil characteristics influence harvest quality and taste.

Figure 1:
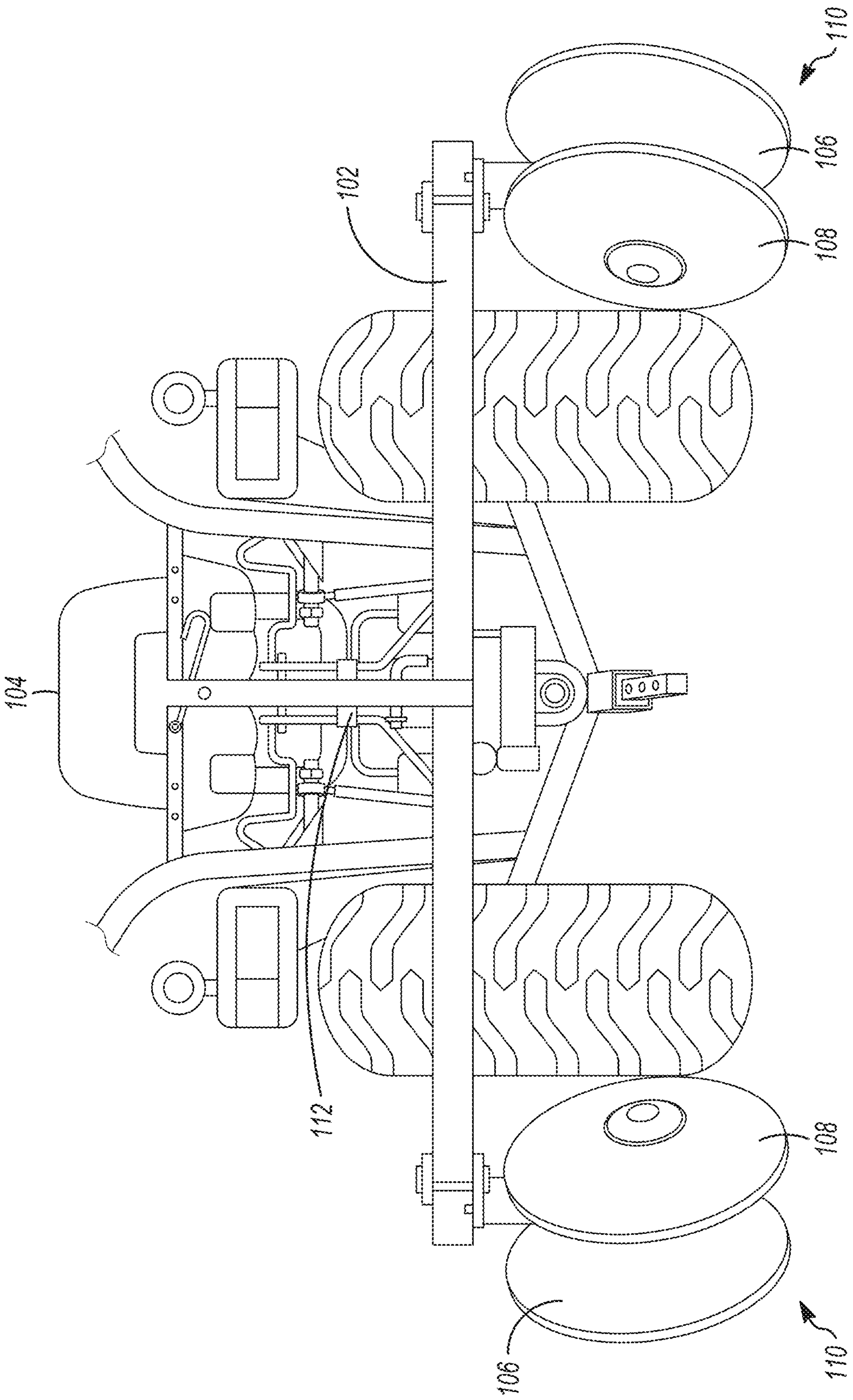
FIG. 1 shows an adaptive tillage control system coupled to a vehicle (e.g., a tractor).

In FIG. 1, a chassis shown as a cross bar 102 couples a vehicle 104 at a hitch point 112. The height of the hitch point 112 relative to the ground is adjustable, and in some systems, is dynamically adjustable and adaptable to changing terrains. In some systems adjustments occur in response to adaptive tillage control signals. The height adjustments may affect the depth and the penetration of the cutting and casting rotary discs 106 and 108. In these alternative systems, optional hydraulic cylinders and/or mechanical levers responsive to adaptive tillage control may adjust and, in part establish the depth of individual cutting and casting rotary discs 106 and 108, groupings or pairs of the cutting and casting rotary discs 110, or alternatively, all of the cutting and casting rotary discs 106 and 108 individually and/or the hitch point 112. In FIG. 1 a plane of symmetry passes through a central portion of the cross bar 102 separating the grouping pairs of the cutting and casting rotary discs 110 into two substantially identical halves. In other systems, the halves are asymmetric adapting to the layout of the spaced out furrows and/or plant ridges. In some applications, a higher pitch point 112 contributes to a shallower cutting depth and a smaller displacement of soil and a lower pitch point contributes to a deeper cutting depth and a larger displacement of soil.

Figure 2:
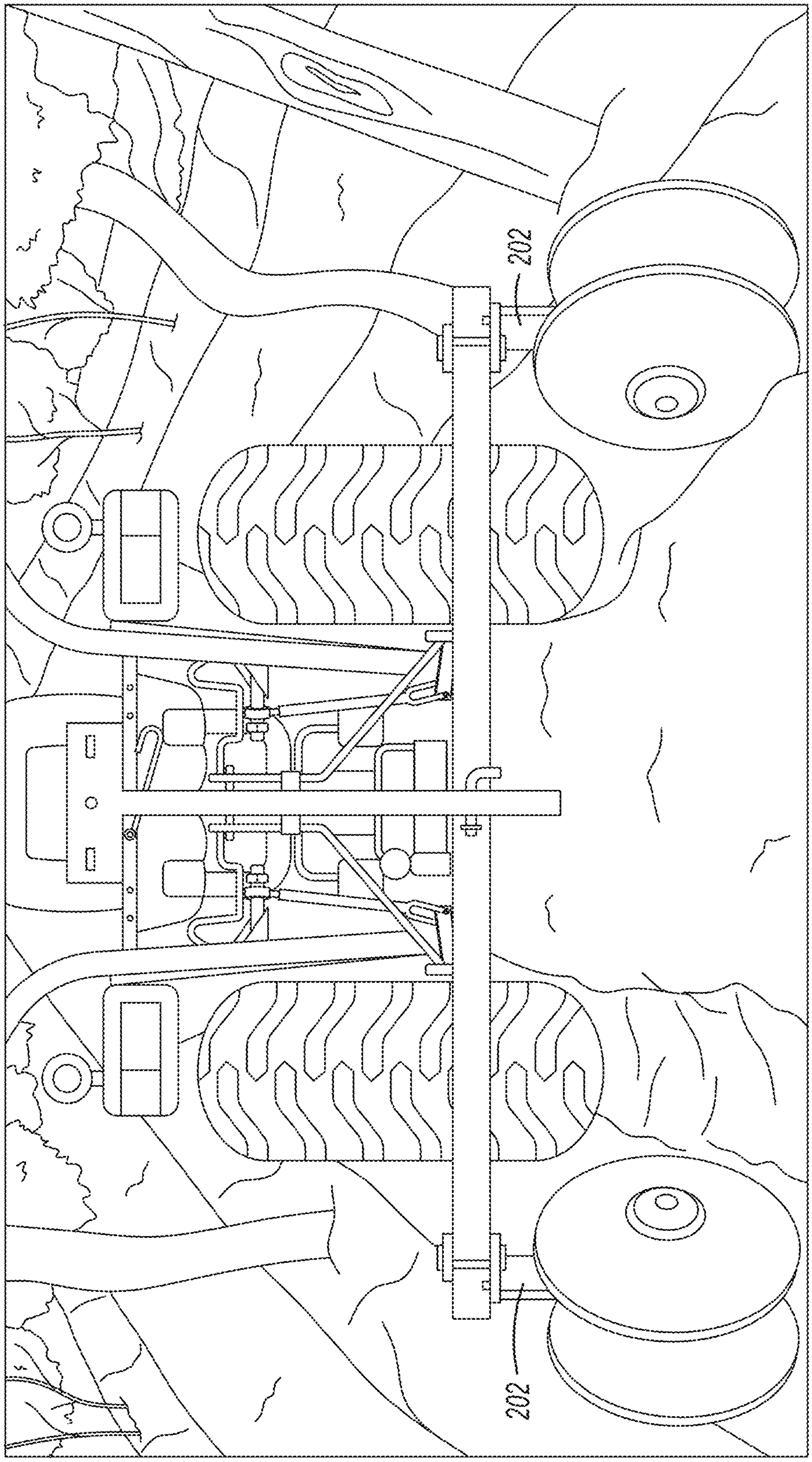
FIG. 2 shows the adaptive tillage control system coupled to a vehicle in a field.
Figure 4:
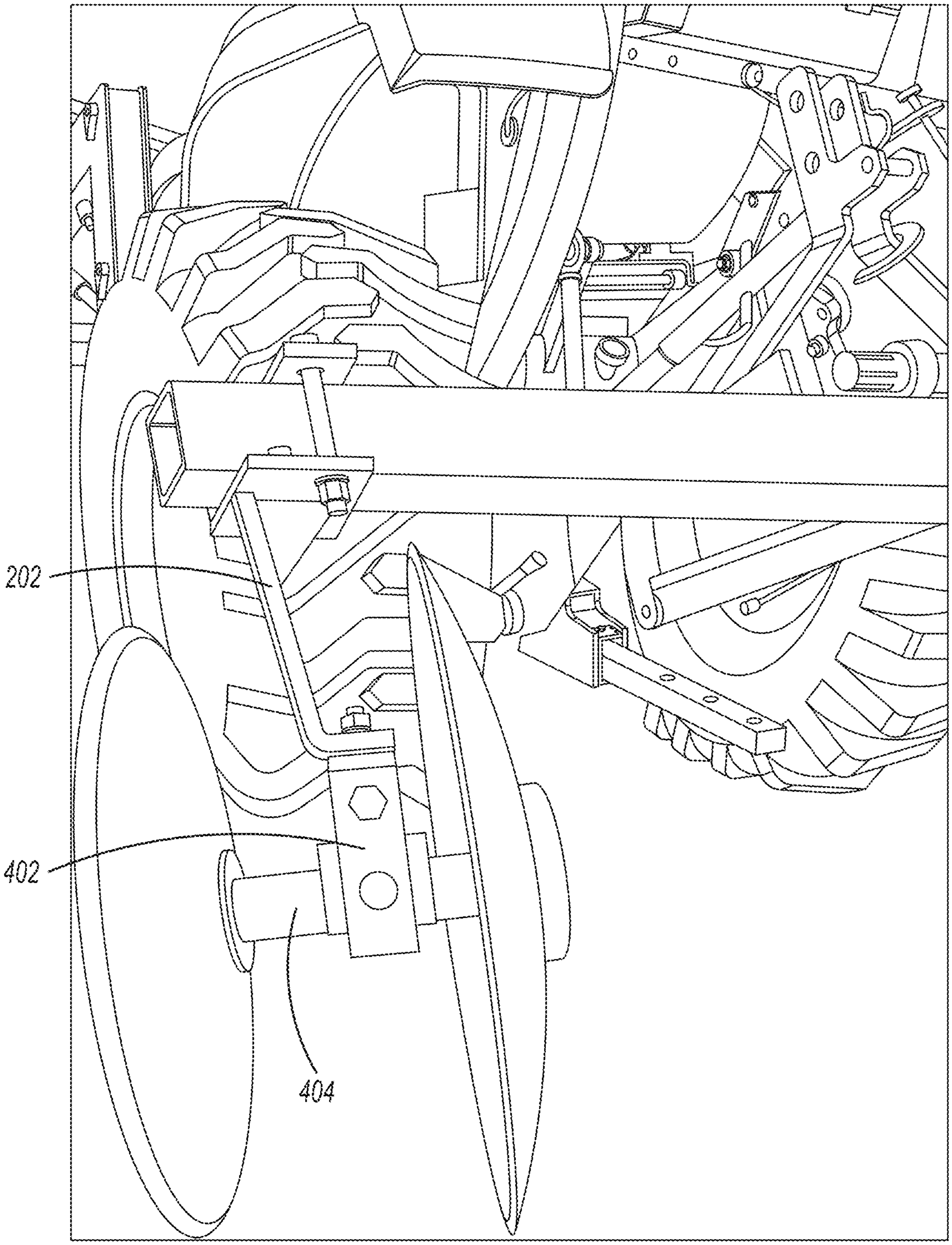
FIG. 4 shows two round cutting and casting rotary discs terminating at smooth edges coupled to a vehicle, each round cutting and casting rotary disc has a convex longitudinal side and a concave longitudinal side.

In FIG. 2 or 4, one or more connecting bars 202 and mechanical and/or electro-mechanical linkages 402 for example, couple the axles 404 of the cutting and casting rotary discs 106 and 108. In some alternative systems, the linkages 402 comprise a dynamic angle adjuster and a lock that couple the axles 404 to the cutting and casting rotary discs 106 and 108. Alternatively, the dynamic angle adjuster and locks include hydraulic actuators and mechanical locks that enable smooth and on-the-go angle and/or depth adjustments to the hitch point 112, axles 404 and/or each of the cutting and casting rotary discs 106 and 108 by controlling hydraulic flow (not shown). Other alternative dynamic angle adjusters and locks comprise threaded rods and a motors that adjust angles and depths by extending and/or retracting threaded linkages or rods. Other dynamic angle adjusters and secure locks also comprise electric motors and gear systems that provide precision and programmability to adjust and lock in hitch point 112 and/or cutting and/or casting rotary discs 106 and 108 angles and/or depths.

Each cutting and casting rotary disc 106 and 108 has a continuous circular perimeter having a convex outer vertical surface on a proximal side opposite a concave outer vertical surface at a distal side terminating at a sharpened or beveled edge. In FIGS. 1 and 2, the sharpened or beveled edge is smooth and continuous to enable a larger displacement of soil by the cutting and casting rotary discs 106 and 108. In other systems, the one or more cutting and casting rotary discs 106 and 108 include serrated, scalloped, and/or notched (e.g., cut-away portions) terminating edges, respectively, that generally increase the cutting penetration depth of the casting rotary discs 106 and 108 into the soil.

With respect to FIGS. 2 and 4, mechanical linkages 402 couple the cutting and casting rotary discs 106 and 108 to the connecting bars 202, respectively. In some systems, the mechanical linkages 402 may be manually adjusted and manually set or locked in place to contribute to how aggressively the cutting and casting rotary discs 106 and 108 cut into the soil. In other systems, the mechanical and/or electro-mechanical linkages 402 or links are automatically adjustable and adaptive to an adaptive tillage control and/or signal delivered through an I/O interface 908. The adaptive tillage controller (e.g., such as a PID controller 916 and/or processor 902) automatically adjusts the cutting and casting rotary discs 106 and 108 in response to an adaptive tillage control signal. The adjustments in some alternate systems are also executed through optional hydraulic cylinders that position each of the cutting and casting rotary discs 106 and 108, for example.

In operation, the mechanical linkage settings contribute to the controlled depth and width that each cutting and casting rotary discs 106 and 108 cuts into the soil. The linkages 402 adjust the cutting and casting rotary disc angle ($\kappa_{rotary\text{-}disc\text{-}ground}$), which measures the angle between the direction of travel (e.g., such as the system traveling in a straight line motion) represented as a rectangular plane and the plane that includes a vertical side of the cutting and casting rotary discs 106 and 108. A larger casting rotary disc angle cuts deeper into the soil and moves more volume of soil and a smaller rotary disc angle moves less soil and is easier to propel. At $\theta_{rotary\text{-}disc\text{-}ground}=90°$, the cutting and casting rotary disc is perpendicular to the travel direction of the system (and vehicle) and all the energy moves the soil laterally reducing the kinetic energy of the blade. At $\theta_{rotary\text{-}disc\text{-}ground}=0°$, all of the force aligns with the direction of travel, minimizing lateral motion focusing the energy on cutting and lifting.

In reference to FIGS. 1 and 2, the respective groupings or pairs of cutting and casting rotary discs 110 (spaced apart cutting and casting rotary discs in each group) are positioned to achieve a measured or estimated soil coverage for respective furrows and/or plant ridges that are on the field side off-set from the respective groupings 110. Plant ridges are raised mounds of soil created to support plant growth. When the connecting bar 202 is perpendicular to the ground and establishes a base-line on a compass and the cutting and the vertical sides of the casting rotary discs establish a measured line on a compass, the casting rotary disc angles ($\theta_{rotary\text{-}disc\text{-}ground}$) may range from a moderate rotary disc angle ($\theta_{rotary\text{-}disc\text{-}ground}$) range up to and including between about 5° to 20° to a steeper rotary disc angle range up to and including between about 21° to 30°, for example. In alternate systems, more moderate and/or more aggressive rotary disc angles ($\theta_{rotary\text{-}disc\text{-}ground}$) are adaptively and/or automatically set to achieve a desired or estimated volume displacement and coverage.

Figure 3:
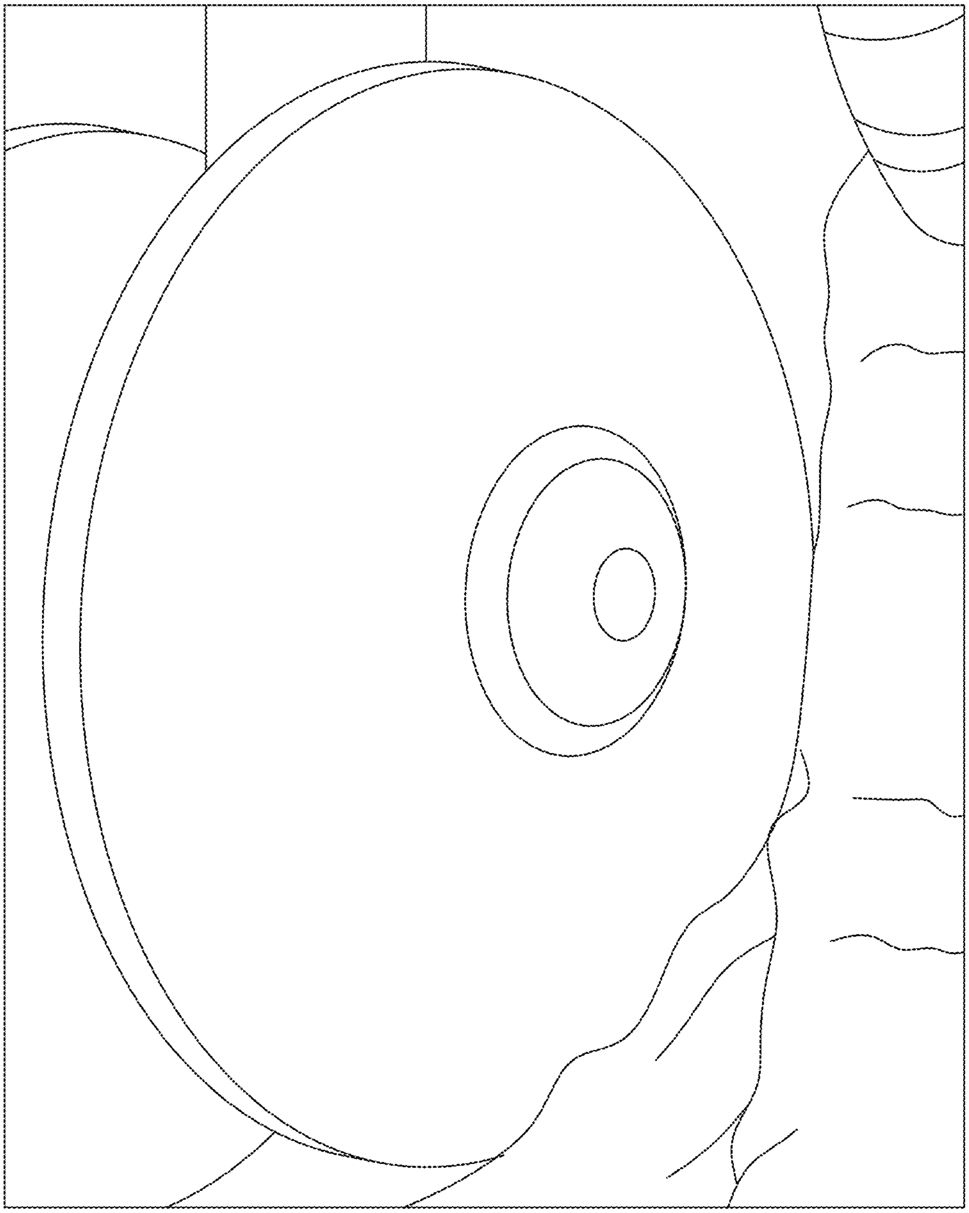
FIG. 3 shows a round convex longitudinal side of a cutting and casting rotary disc terminating at a smooth edge.

In FIGS. 1 and 2, the convex vertical side of the outer cutting and casting rotary discs 106 face outward to the field side and plant ridges. This allows the outer cutting and casting rotary discs 106 to cut into the soil as shown in FIG. 3, lift the soil, and cast the soil away and upon the vertical sides and upper surfaces of desired root zones or plant ridges. The concave vertical surfaces of the outer cutting and casting rotary discs 106 face inward, allowing the soil to be scooped and flipped, which effectively cuts and mixes the soil during rotation. The convex vertical side of the inner cutting and casting rotary discs 108 face inward away from the field side and plant ridges creating a lift and casting soil away from the field side and plant ridges to maintain the shape of the plant ridges. By maintaining the plant ridges, the system mitigates waterlogging that can damage roots, moderates temperatures by elevating the root ball that facilitates growth, improves soil aeration that benefits root growth, and reduces weed pressure making it easier to control weeds. The concave vertical inner side of the of the inner cutting and casting rotary discs 108 face inward toward the concave side of outer cutting and casting rotary discs 106. The concave side further scoops soil and flips desired or estimated soil volumes, which effectively cuts and mixes the soil with the concave vertical side of outer cutting and casting rotary discs 106.

At the center of the cutting and casting rotary discs 106 and 108 are circular bores that allow the cutting and casting rotary discs 106 and 108 to be mounted onto their respective axles 404 (one is referenced in FIG. 4). In some systems, the bores are reinforced to resist impact wear and corrosion. Some cutting and casting rotary discs 106 and 108 include bearings and spacers to maintain rotary disc alignment and spacing. The convex and concave vertical surfaces are substantially smooth, and some vertical and cutting surfaces are coated or finished to reduce friction and extend the useful life of the discs. When the cutting and casting rotary discs 106 and 108 are grouped, such in groups of two 110 as shown in FIGS. 1 and 2, may be mounted to a common axle allowing the mechanical linkage or electro-mechanical linkages 402 to adjust the cutting and casting rotary disc angle ($\theta_{rotary\text{-}disc\text{-}ground}$) of the discs simultaneously. The separation between the grouped 110 cutting and casting rotary discs 106 and 108 allows soil to flow between the discs, allows the discs to cut through soil and undesired vegetation, turn and mix soil layers, provide a measured or estimated insulating layer to protect root zones or balls to maintain moisture, provide temperature control, and maintain the shape and properties of the plant ridges.

In FIG. 4, a threaded fastener couples the cutting and casting rotary discs 106 to the connecting bars 202, respectively, rendering a static configuration in some static embodiments. In these static embodiments, the threaded fastener may be manually adjusted and set to contribute to how aggressively the cutting and casting rotary discs 106 and 108 cut into the soil at a consistent depth. The casting rotary disc angle (θrotary-disc-ground) of the grouped 110 cutting and casting rotary discs 106 and 108 is adjusted by loosening the bolt that secures the coupling to a connecting bar 202, then manually rotating the axle 404 that causes the vertical sides of the cutting and casting rotary discs 106 and 108 to be aligned at the desired angle(s), which may be based on the factors expressed herein. This static version of the system and the manual method of adjustment provides a uniform setting that in part sets the cutting depth and the desired soil movement of each of the cutting and casting rotary discs 106 and 108. In some applications, the settings and/or depth of the cutting and casting rotary discs 106 and 108 are set automatically according to the processes described herein.

Figure 5:
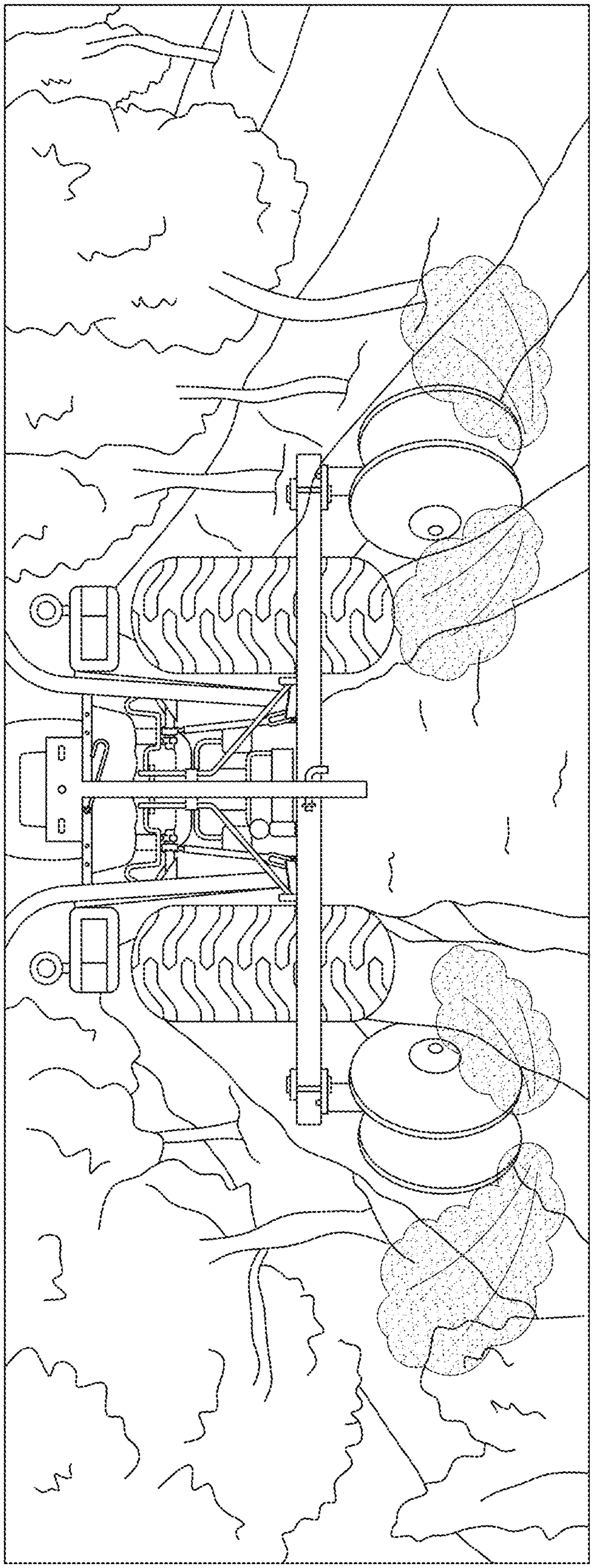
FIG. 5 shows the adaptive tillage control system aerosolizing the soil into a cloud reaching predetermined heights and casting the soil at a calculated angle to a predetermined area away from the adaptive tillage control system.
Figure 6:
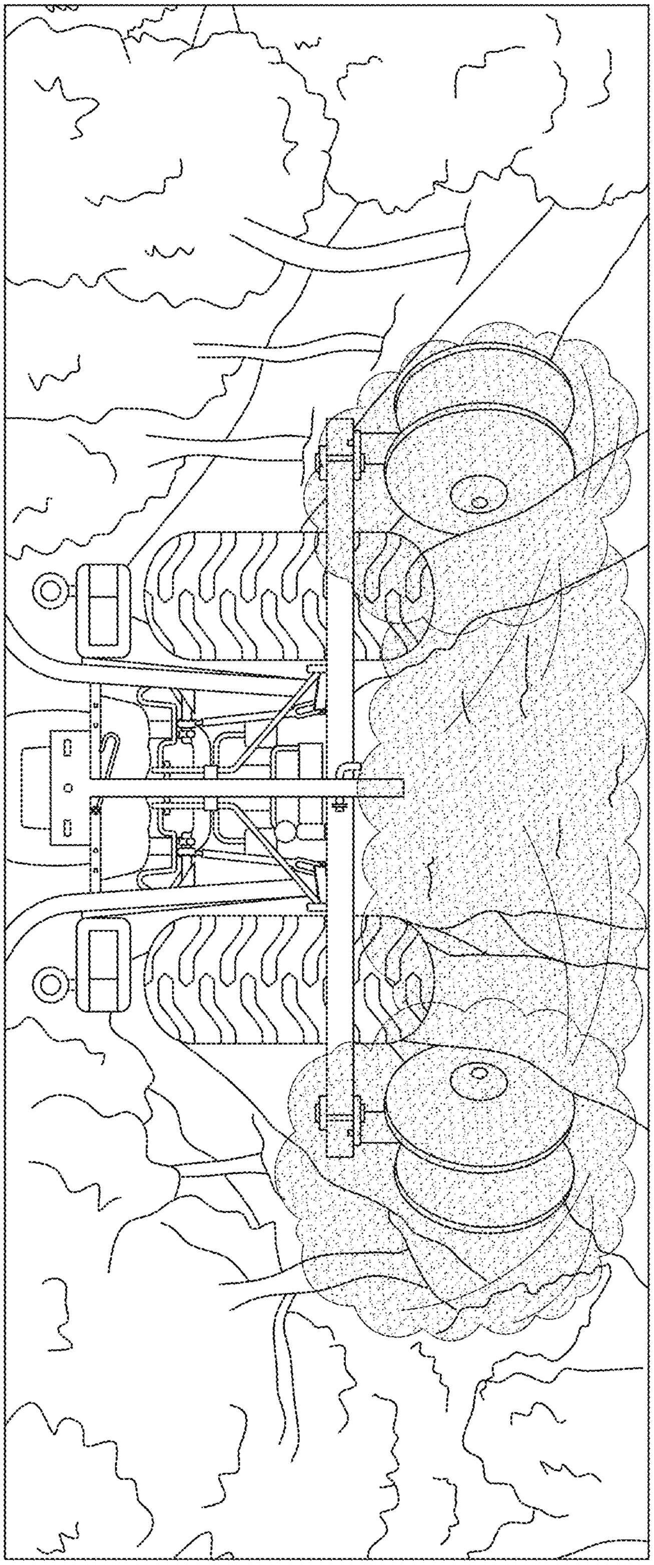
FIG. 6 further shows the adaptive tillage control system aerosolizing the soil into a cloud to a predetermined height and casting the soil across a predetermined area angled from the adaptive tillage control system to field sides.
Figure 7:
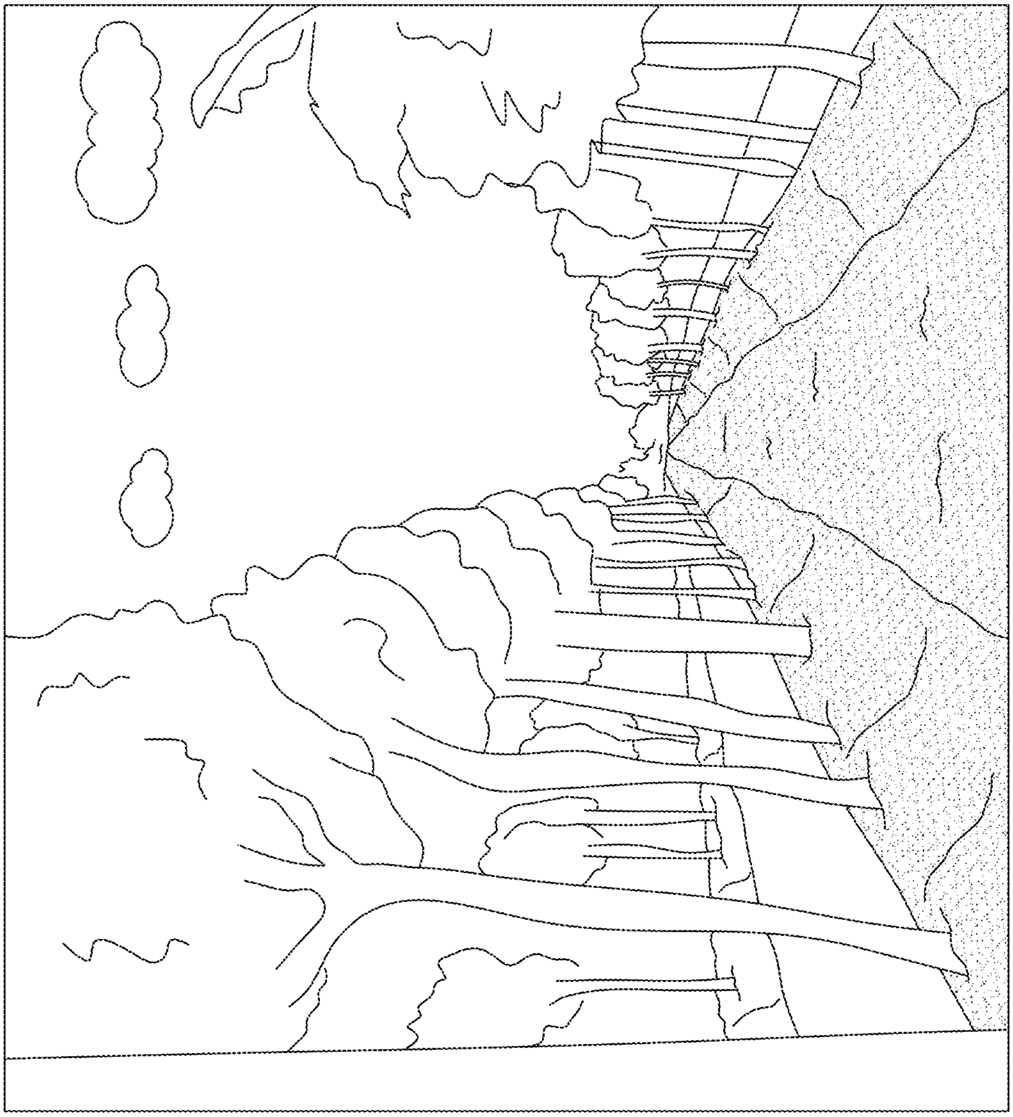
FIG. 7 shows a ridge field covered by a casting of soil moved by the adaptive tillage control system.

In FIGS. 5 and 6, the system configurations of the grouped 110 cutting and casting rotary discs 106 and 108 show two discs positioned near the plant ridges, effectively creating a soil-covering operation. As the outer convex vertical surfaces of the outer cutting and casting rotary discs 106 face the plant ridge, they displace and aerosolize the low lying soil upwards and cast the uplifted soil toward the field side plant ridge away from the outer cutting and casting rotary discs 106 providing a controlled protective layer of soil at and upon the plant ridge. This controlled displacement of soil helps insulate the plant's roots and protect them from temperature fluctuations, while maintaining plant ridge moisture. Additionally, the inner concave vertical surfaces of the cutting and casting rotary discs 106 and 108 face and bound a common area (e.g., a first proximal area near a proximal end of the crossbar 202 and a second distal area near a distal end of the crossbar 202) between the two discs in each group 110, further contributing to a controlled soil movement and coverage between the discs, ensuring a thorough, efficient, and substantially even controlled soil covering through the various topographies of the plant ridges as shown in FIG. 7.

To determine how high and how much soil (e.g., dirt) is aerosolized and cast by the cutting and casting rotary disc 106 and 108, an exemplary model in alternative systems establish a relationship between acceleration of the system, velocity of the system, and the cutting and casting rotary disc angle ($\theta_{rotary\text{-}disc\text{-}ground}$) measured in radians. Since the dirt height is proportional to the kinetic energy of the cutting and casting rotary discs 106 and 108 and the rotary disc angle ($\theta_{rotary\text{-}disc\text{-}ground}$), the height of the dirt kicked up by the system may be expressed by equation 1.

$$h=k_h\times v^2\times\sin(\theta_{rotary\text{-}disc\text{-}ground}) \quad (1)$$

where v is the velocity of the cutting and casting rotary disc (m/s) and $k_h$ is the height coefficient that is based on the soil density and disc shape (unitless). In equation 1, the height of the dirt kicked up increases with the square of the velocity because of quantified kinetic energy. It also varies with a function of the rotary disc angle because the steeper the angle the more vertical dirt is cast.

The dirt volume (V) is proportional to the contact surface area of the cutting and casting rotary discs 106 and 108 and the speed in which they pass through the soil and a measure of the looseness of the soil $C_s$ (unitless), which has a higher value in sandy soil) in another exemplary model.

$$V=k_v\times v\times a\times C_s\cos(\theta_{rotary\text{-}disc\text{-}ground}) \quad (2)$$

Here, a is the acceleration of the cutting and casting rotary disc (m/s$^2$) and $k_v$ is the volume coefficient that varies with the cutting and casting rotary disc. In equation 2, the volume, V, of the dirt kicked up is modeled to increase linearly with velocity and acceleration. The cosine function accounts for the state of more dirt being kicked up laterally.

Since the depth (d) of the cutting and casting rotary disc 106 and 108 also affects the height of the dirt kicked up and the volume of the dirt moved, the exemplary models may be adjusted to account for depth. In relation to the height, the depth of the cutting and casting rotary discs 106 and 108 affect the energy transferred into the soil. As the cutting and casting rotary discs 106 and 108 cut deeper, the more resistance the cutting and casting rotary discs 106 and 108 experience. As for volume, it is directionally proportional to the depth of the cutting and casting rotary discs 106 and 108, since a deeper cut engages more soil, which increases the cross-sectional area of the soil distributed. The adjusted model for the height of dirt cast up may be expressed as equation 3.

$$h=k_h\times v^2\times\sin(\theta_{rotary\text{-}disc\text{-}ground})\times e^{k_d\times d} \quad (3)$$

Where d is depth of the cutting and casting rotary discs 106 and 108 in the soil (m); $k_d$ is a depth sensitivity coefficient that varies with a measured soil type and the blade geometric shape the tills the soil established by empirical analysis and is unitless, and $e^{k_d\times d}$ is the exponential factor that represents the diminishing height as depth increases. In short, the exponential decay reflects that as depth increases, the dirt kicked (cast) up is affected by more resistance and spreads the energy over a larger soil mass.

The adjusted model for the controlled volume of the dirt cast (kicked) up accounts for the movement of more soil as the cutting and casting rotary disc 106 and 108 descends to greater depth as expressed in equation 4.

$$V=k_v\times v\times a\times C_s\times d\times\cos(\theta_{rotary\text{-}disc\text{-}ground}) \quad (4)$$

To dynamically control the height and volume of the dirt cast up at and upon the furrows and plant ridges an alternative adaptive tillage control system processes adjustable parameters such as the cutting and casting rotary discs' depth (d), velocity (v), and rotary disc angle ($\theta_{rotary\text{-}disc\text{-}ground}$). The systems adjust the cutting and casting rotary discs 106 and 108 height (d), velocity (v), and rotary disc angle ($\theta_{rotary\text{-}disc\text{-}ground}$) dynamically to meet a desired height aerosolized (h) and volume (v) target. From the exemplary height model, velocity may be expressed as equation 5.

$$v=\sqrt{\frac{h}{k_h\times\sin(\theta_{rotary-disc-ground})\times e^k d^{\times d}}} \quad (5)$$

When acceleration is constant, the volume (V) may be expressed as equation 2. From equation 3, the depth model may be expressed by equations 6 and 7 and the casting rotary disc angle ($\theta_{rotary\text{-}disc\text{-}ground}$) may be expressed by equations 8 and 9.

$$d=\frac{\ln\left(\frac{h}{k_h\times v^2\times\sin(\theta\text{rotary}-\text{disc}-\text{ground})}\right)}{k_d} \quad (6)$$

$$d=\frac{V}{k_v\times v\times a\times C_s\times d\times\cos(\theta_{rotary-disc-ground})} \quad (7)$$

$$\theta_{rotary-disc-ground}=\arcsin\left(\frac{h}{k_h\times v^2\times e^k d^{\times d}}\right) \quad (8)$$

$$\theta_{rotary-disc-ground}=\arccos\left(\frac{V}{k_v\times v\times a\times C_s\times d}\right) \quad (9)$$

Further, the calculated depth (d) of the cutting and casting rotary disc 106 and 108 may be modified or compensated based on the hitch height ($h_{hitch}$) relative to the ground in some alternative models. In these alternative models, the effective depth ($d_{effective}$) of the cutting and casting rotary discs 106 and 108 is substituted for the calculated depth (d) of the cutting and casting rotary discs 106 and 108. In these alternative models, the hitch height ($h_{hitch}$) relative to the ground may affect the effective depth height ($d_{height}$) of the cutting and casting rotary disc 106 and 108 as expressed in the equation 10.

$$d_{effective}=d_{set}-k_h \times h_{hitch} \tag{10}$$

Where $d_{set}$ is the nominal setting on the cutting and casting rotary disc 106 and 108, $h_{hitch}$ is the height of the hitch relative to the ground, and $k_h$ is the proportionality constant accounting for how the hitch height changes depth.

Alternatively, the calculated depth (d) of the cutting and casting rotary disc 106 and 108 may be modified or compensated based on the hitch height ($h_{hitch}$) to the ground and the blade diameter ($d_b$) making the effective depth ($d_{effective}$) of the cutting and casting rotary discs 106 and 108 based on a proportional hitch height relationship as expressed in alternative model expressed by equation 11.

$$d_{effective} = d_b \times \left(1 - \frac{h_{hitch}}{h_{max}}\right) \tag{11}$$

Where $d_{effective}$ is the effective depth of the cutting and casting rotary disc 106 and 108, $h_{max}$ is the maximum allowable hitch height that keeps the cutting and casting rotary discs 106 and 108 engaged in the soil, and $h_{hitch}$ is the height of the hitch relative to the ground.

To control the height and volume of the dirt cast up in real time, a multi-objective optimization of equations 1 and 2 is solved simultaneously. If the rotary disc angle ($\theta_{rotary\text{-}disc\text{-}ground}$) is substantially constant, the variables (v, d) are solved with respect to the desired height (h) and volume (V). Alternatively, (v, d, $\theta_{rotary\text{-}disc\text{-}ground}$) are adjusted dynamically through movement and mechanical linkages such as electro-mechanical linkages and actuators, for example, in response to one or more adaptive tillage control signals from one or more controllers, for example, such as a Proportional-Integral-Derivative Controller (PID Controller) 916 and/or one or more processors 902 that deliver the one or more adaptive tillage control signals. The adaptive tillage control can continuously adjust the parameters to minimize the error calculated by the one or more processors 902 and/or PID controller 916 between a desired rotary disc angle, ($\theta_{rotary\text{-}disc\text{-}ground}$), a desired soil height kicked up, (h), and a desired soil volume displaced, (V) stored in memory and the measured parameters made by sensors.

Figure 8:
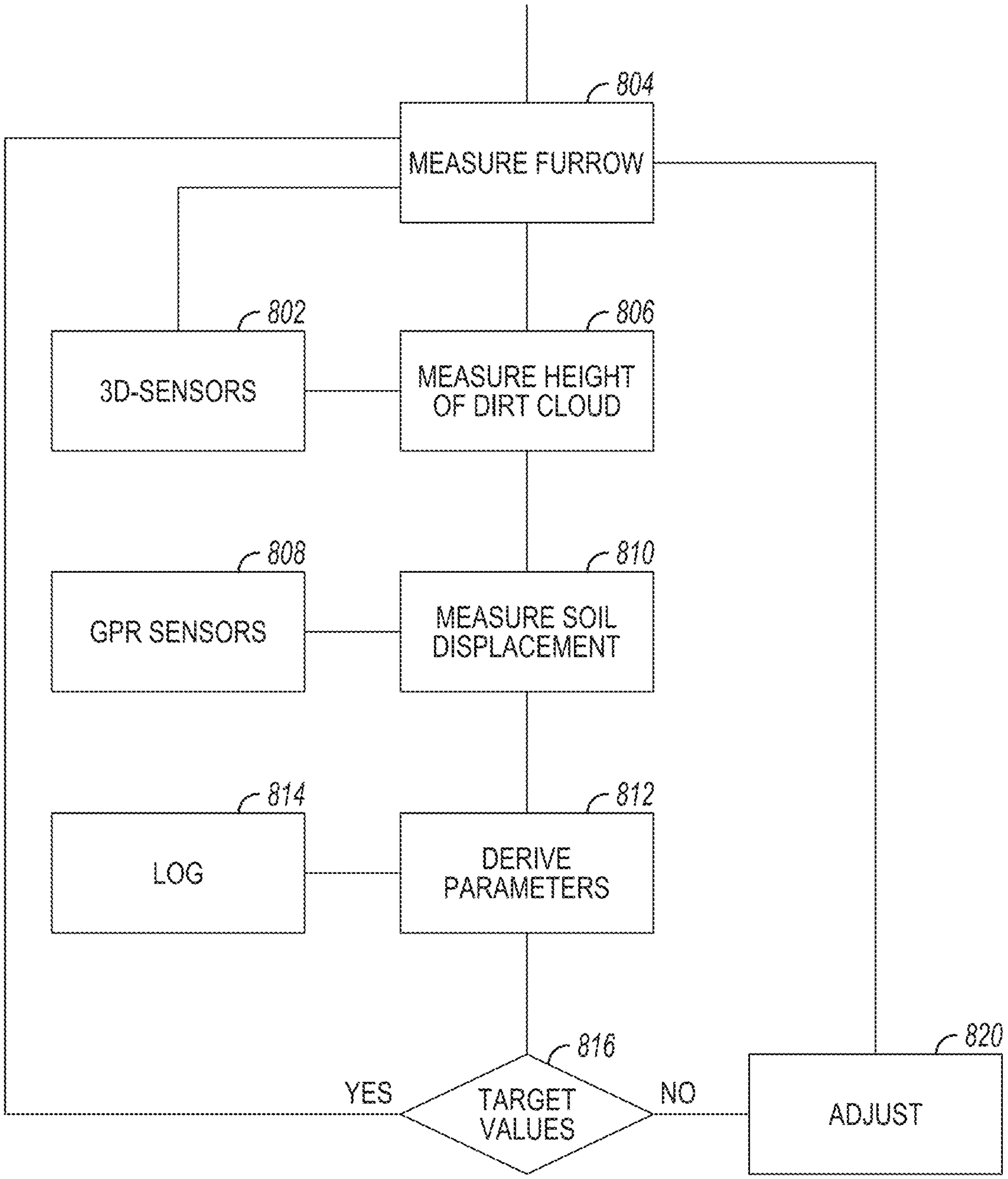
FIG. 8 shows an adaptive process of the adaptive tillage control system.

FIG. 8 shows an adaptive process (932 in FIG. 9) of an adaptive tillage control system. The process uses one or more high-speed cameras and/or lidar sensors to measure the dimensions of furrows and plant ridges 804 and track the trajectory (that includes distance) of soil particles at 802 and 804. The three dimensional sensors 802 further measure the maximum height (or height distribution) of the dirt cloud shown in FIGS. 5 and 6 relative to the plant ridges and/or furrows allowing the process to execute image processing that measures optical flow and object detection to identify and calculate the dirt cloud's peak height a/or distribution at 806. Some processes further process data from distance sensors, such as one or more vertical laser or ultrasonic distance sensors to further measure the height and shape of the dirt cloud. The measurement render three dimensional models of the dirt cloud.

The volume of the soil or dirt kicked up is calculated by integrating the three dimensional models shape and density over time. Soil displacement sensors such as ground penetrating radar or force sensors 808 detect the displacement 810 and mass of the soil caused by the cutting and casting rotary disc 106 and 108 with respect to speed to estimate the displacement volume. The process identifies the dirt trajectories and a distributed or maximum height h and calculate the displaced volume V at 812 and stores the values in a log in a memory 904 in real time at optional 814. At 816 the process compares the detected trajectories, height, h, and volume, V, to the desired target values stored in memory 904 at 816. It then dynamically adjusts the cutting and casting rotary discs 106 and 108 depth (d), velocity (v) and/or vehicle velocity in other systems, and rotary disc angle ($\theta_{rotary\text{-}disc\text{-}ground}$) at 820 to attain a target and/or measured coverage. In some alternative systems, the hitch height ($h_{hitch}$) may also be adjusted at 820. The adjustments are made by motors, hydraulics, and actuators, for example, based on the calculated feedback at 816 as the system continues to measure and adjust the parameters. The exemplary system of FIG. 8 ensures consistent volume and height of the plant ridge coverage and depth regardless of soil variability, reduces the need for manual system adjustments, and provides data that is wirelessly transmitted to a remote destination or Web site via a cellular transceiver or a Wi-Fi transceiver to provide data and analytics for future operations. In alternative systems and processes, the adaptive control system receive updated configurations from the remote destination that update values and vary configurations in real-time or as the process is executed.

Figure 9:
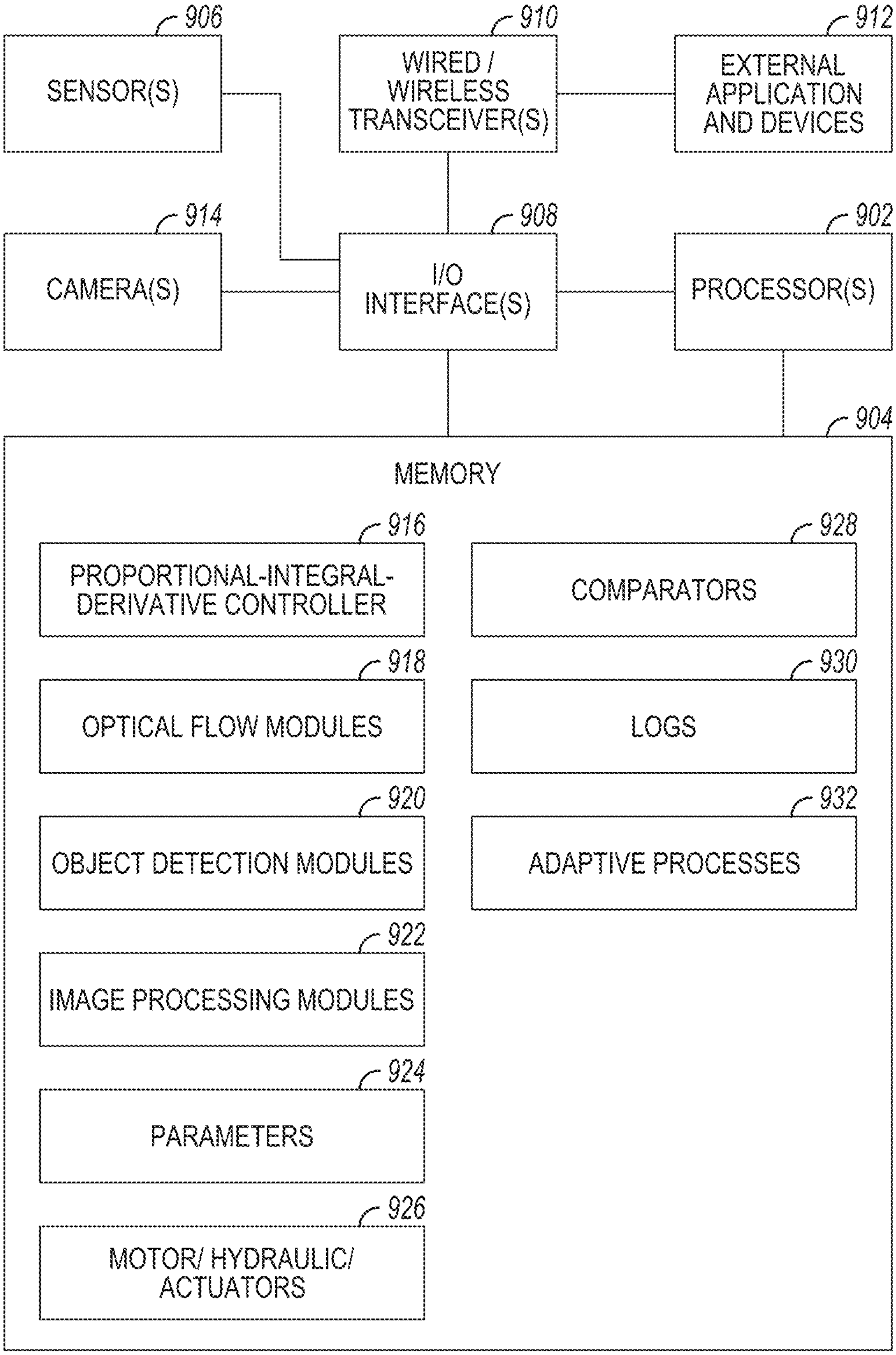
FIG. 9 is a block diagram of an exemplary adaptive tillage control used in some adaptive tillage control systems.

FIG. 9 is a block diagram of an alternative adaptive tillage control system that may execute the process flows, functions, and execute the system controls described herein and those shown in FIGS. 1-8 respectively or collectively in alternative systems. The control system comprises one or multiple processor units or graphical processor unit 902, a non-transitory computer readable media such as a memory 904 (the contents of which are accessible by the one or more processors and/or graphical processors 902), one or more sensors 906, one or more cameras 914, one or more input/output interfaces 908. The one or more one or more input/output interfaces 908 connect to one or more transceivers 910 (among other devices and communication channels) that communicates with and connect devices and local and/or remote applications 912 such as, for example, additional local and/or remote monitored cameras and wireless sensors and analytic sites. The memory 904 stores instructions, which when executed by the one or more processors 902, causes the adaptive tillage control system to automatically render functionality such as the adaptive process of FIG. 8 and actuate hardware that enables adaptive tillage control. In some systems it includes a proportional-integral-derivative controller 916, one or more optical flow modules 918 that estimate motion of objects through computer vision and/or other data, one or more object detection modules 920 that identify and locate objects through computer vision and/or other data, one or more image processing modules 922, one or more stored constants and parameters including e.g., v, d, $\theta_{rotary\text{-}disc\text{-}ground}$, $h_{hitch}$, V, . . . and/or etc. and combinations 924, for example, motor/hydraulic/actuators settings, commands, etc. 926 and comparison logic 928, logs 930, and the processes described herein 932.

The memory 904 and/or storage disclosed may retain an ordered listing of executable instructions for implementing the functions described above in a computer code or a non-transitory machine readable medium. The non-transitory machine-readable medium is encoded with a machine-executable instructions, wherein the execution of the machine-executable instructions by the one or more processors 902 executes functions such as detecting trajectories, heights, and volumes of dirt kicked up and displaced to a target destination by one or more of the cutting and casting rotary discs 106 and 108. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM or Flash memory), SSD, or a database and/or database management system. The memory 904 may comprise a single device or multiple devices that may be disposed in one or more dedicated memory devices or disposed in a processor or other similar device.

The term "coupled" disclosed in this description encompasses both direct and indirect coupling. Thus, adaptive tillage control system (e.g., adaptive control system) couples a vehicle when they directly connect with one another, as well as when the adaptive tillage control system connects to a vehicle via one or more intermediate parts. When functions, steps, etc. are "responsive to" or occur "in response to" another function or step, etc., the functions or steps necessarily occur as a result of another function or step, etc. A device that is responsive to another requires more than an action (i.e., the device's response to) merely follow another action. The term "substantially" or "about" encompasses a range that is largely, but not necessarily wholly, that which is specified. It encompasses all but a significant amount, such as within five percent. In other words, the terms "substantially" or "about" means equal to or at or within five percent.

Alternate systems are not limited to the particular hardware, models, and algorithms described above. Other suitable hardware and algorithms can be used. Furthermore, the systems are not limited to tilling vineyards. Rather, the systems can provide soil management and cultivation for other plants. The systems illustratively disclosed herein suitably may be practiced in the absence of any element (including hardware and/or software), and in the absence of some or all of the described functions association with a process step or component or structure that are expressly described. Alternate systems may operate in the absence one or more of those process steps, elements and/or any subset of the expressed functions. Further, the various elements described in each of the many systems described herein is regarded as divisible with regard to the individual elements described, rather than inseparable as a whole. In other words, alternate systems encompass any variation and combinations of elements, components, and process steps described herein and may be made, used, or executed without the various elements described (e.g., they may operate in the absence of). Further, the system can measure and control other variables such as the cutting and casting rotary disc 106 and 108 disc or blade tilt (tilt) to control the height, volume, and/or area of coverage.

The adaptive tillage control systems insulate root regions, prevent desiccation, and provide protection against adverse weather conditions. The systems mitigate erosion and damage while enhancing grape producing vines. The systems adjust soil displacement, soil movement, and soil manipulation that improves drainage and protects against erosion. Using one or more cutting and casting rotary discs 106 and 108, the adaptive tillage control system cuts through soil and other matter, scoops up and lifts soil to calculated heights, and casts the lifted soil to a predetermined trajectory to one or more predetermined zone areas away from the adaptive tillage control system. In some alternative systems, the height of the displaced soil and the volume of the soil that displaced is controlled and adapted in response to the system's acceleration, system's velocity, the field's soil type, the depth and/or angle(s) of the one or more cutting and casting rotary discs 106/108 to an intended coverage and depth.

Other systems, methods, features, and advantages will be, or will become, apparent to one with skill in the art upon examination of the figures and detailed description. It is intended that all such additional systems, methods, features, and advantages be included within this description, be within the scope of the disclosure, and be protected by the following claims.

The invention claimed is:

1. An adaptive tillage control system, comprising:

a crossbar that couples a vehicle at a hitch point;

a connecting bar couples the crossbar; and a plurality of cutting and casting rotary discs couple the connecting bar through a plurality of mechanical linkages that are responsive to an adaptive tillage control that facilitate angular positions of the plurality of cutting and casting rotary discs and a depth adjustment of the plurality of cutting and casting rotary discs;

the plurality of cutting and casting rotary discs comprising a continuous circular perimeter and having a convex outer vertical surface on an exterior side opposite a concave outer vertical surface at an inner side terminating at an edge;

the plurality of cutting and casting rotary discs form a first pair of cutting and casting rotary discs at a proximal end of the crossbar and a second pair of cutting and casting rotary discs at a distal end of the crossbar;

the first pair of cutting and casting rotary discs having the convex outer vertical surfaces facing outward and the concave outer vertical surface facing inward; the concave outer vertical surface bound a first proximal area near the proximal end of the crossbar;

the second pair of cutting and casting rotary discs having the convex outer vertical surfaces facing outward and the concave outer vertical surface facing inward; the concave outer vertical surface bound a second proximal area near the distal end of the crossbar; and where the angular positions are based on a depth sensitivity coefficient; and the depth sensitivity coefficient varies with a plurality of geometric shapes of the plurality of cutting and casting rotary discs and varies with a soil type that the plurality of cutting and casting rotary discs till.

2. The adaptive tillage control system of claim 1, where the adaptive tillage control comprises an adaptive tillage control signal that adjusts a casting rotary disc angle measured between a direction of travel of the vehicle and a vertical side of one the plurality of cutting and casting rotary discs.

3. The adaptive tillage control system of claim 1, where the angular positions are based on a looseness coefficient that varies with a measure of a looseness of a soil.

4. The adaptive tillage control system of claim 1, where the angular positions are based on a dirt volume proportional to a contact surface area of one of the plurality of cutting and casting rotary discs.

5. The adaptive tillage control system of claim 1, further comprising a plurality of sensors that detect a displacement and a mass of soil caused by one of plurality cutting and casting rotary discs.

6. The adaptive tillage control system of claim 5, further comprising one or more sensors that track a plurality dirt trajectories displaced by the plurality of cutting and casting rotary discs.

7. The adaptive tillage control system of claim 6, where a processor processes trajectory sensor data to render an estimated height of a dirt displaced by the plurality of cutting and casting rotary discs.

8. The adaptive tillage control system of claim 5, further comprising a processor that processes displacement sensor data from the plurality of sensors to estimate a volume of soil cast by the plurality cutting and casting rotary discs.

9. The adaptive tillage control system of claim 1 where a plane of symmetry passes through a central portion of the crossbar separating the first pair of cutting and casting rotary discs and the second pair of cutting and casting rotary discs.

10. The adaptive tillage control system of claim 1 where a hydraulic actuator couples the hitch point.

11. A non-transitory machine-readable medium encoded with a machine-executable instructions, wherein execution of the machine-executable instructions by a processor to detect trajectories, a height, and volume of dirt kicked up by a plurality of cutting and casting rotary discs comprising:

enabling a plurality of sensors to measure a plurality of plant ridges;

measuring a height of a dirt cloud generated by the plurality of cutting and casting rotary discs;

calculating a displaced volume of dirt caused by the plurality of cutting and casting rotary discs;

comparing the height of the dirt cloud generated by the plurality of cutting and casting rotary discs and comparing displaced volume of dirt caused by the plurality of cutting and casting rotary discs to a plurality of target values; and adjusting a depth and a plurality of angular positions of the plurality of cutting and casting rotary discs, respectively, based on the comparing the height of the dirt cloud generated by the plurality of cutting and casting rotary discs and based on the comparing displaced volume of dirt caused by the plurality of cutting and casting rotary discs.

12. The non-transitory machine-readable medium of claim 11, further comprising varying a hitch point based on the comparing the height of the dirt cloud generated by the plurality of cutting and casting rotary discs and based on the comparing displaced volume of dirt caused by the plurality of cutting and casting rotary discs.

13. The non-transitory machine-readable medium of claim 11, where the adjusting occurs through actuators based on a feedback.

14. An adaptive tillage control system, comprising:

a crossbar that couples a vehicle at a hitch point;

a plurality of cutting and casting rotary discs couple the crossbar through a plurality of mechanical linkages that are responsive to an adaptive tillage control that establish angular positions of the plurality of cutting and casting rotary discs;

the plurality of cutting and casting rotary discs comprising a circular perimeter and having a convex outer vertical surface on an exterior side opposite a concave outer vertical surface at an inner side terminating at an edge;

the plurality of cutting and casting rotary discs form a first pair of cutting and casting rotary discs at a proximal end of the crossbar and a second pair of cutting and casting rotary discs at a distal end of the crossbar;

the first pair of cutting and casting rotary discs having the convex outer vertical surfaces facing outward and the concave outer vertical surface facing inward; the concave outer vertical surface bound a first proximal area near the proximal end of the crossbar;

the second pair of cutting and casting rotary discs having the convex outer vertical surfaces facing outward and the concave outer vertical surface facing inward; the concave outer vertical surface bound a second proximal area near the distal end of the crossbar; and where the angular positions are based on a depth sensitivity coefficient that varies with geometric shapes of the plurality of cutting and casting rotary discs and varies with a soil type that the plurality of cutting and casting rotary discs till.

15. The adaptive tillage control system of claim 14, where the adaptive tillage control comprises an adaptive tillage control signal that adjusts a casting rotary disc angle measured between a direction of travel of the vehicle and a vertical side of one the plurality of cutting and casting rotary discs.

16. The adaptive tillage control system of claim 14, where the angular positions are based on a looseness coefficient that varies with a measure of a looseness of a soil.

17. The adaptive tillage control system of claim 14, where the angular positions are based on a dirt volume proportional to a contact surface area of one of the plurality of cutting and casting rotary discs.

18. The adaptive tillage control system of claim 14, further comprising a plurality of sensors that detect a displacement and a mass of soil caused by one of plurality cutting and casting rotary discs.

19. The adaptive tillage control system of claim 18, further comprising one or more sensors that track a plurality dirt trajectories displaced by the plurality of cutting and casting rotary discs.

20. The adaptive tillage control system of claim 18, further comprising a processor that processes displacement sensor data from the plurality of sensors to estimate a volume of soil cast by the plurality cutting and casting rotary discs.

* * * * *